Dec. 2, 1941.   P. O. UNGER ET AL   2,264,419
CABINET
Filed Jan. 20, 1936   6 Sheets-Sheet 1
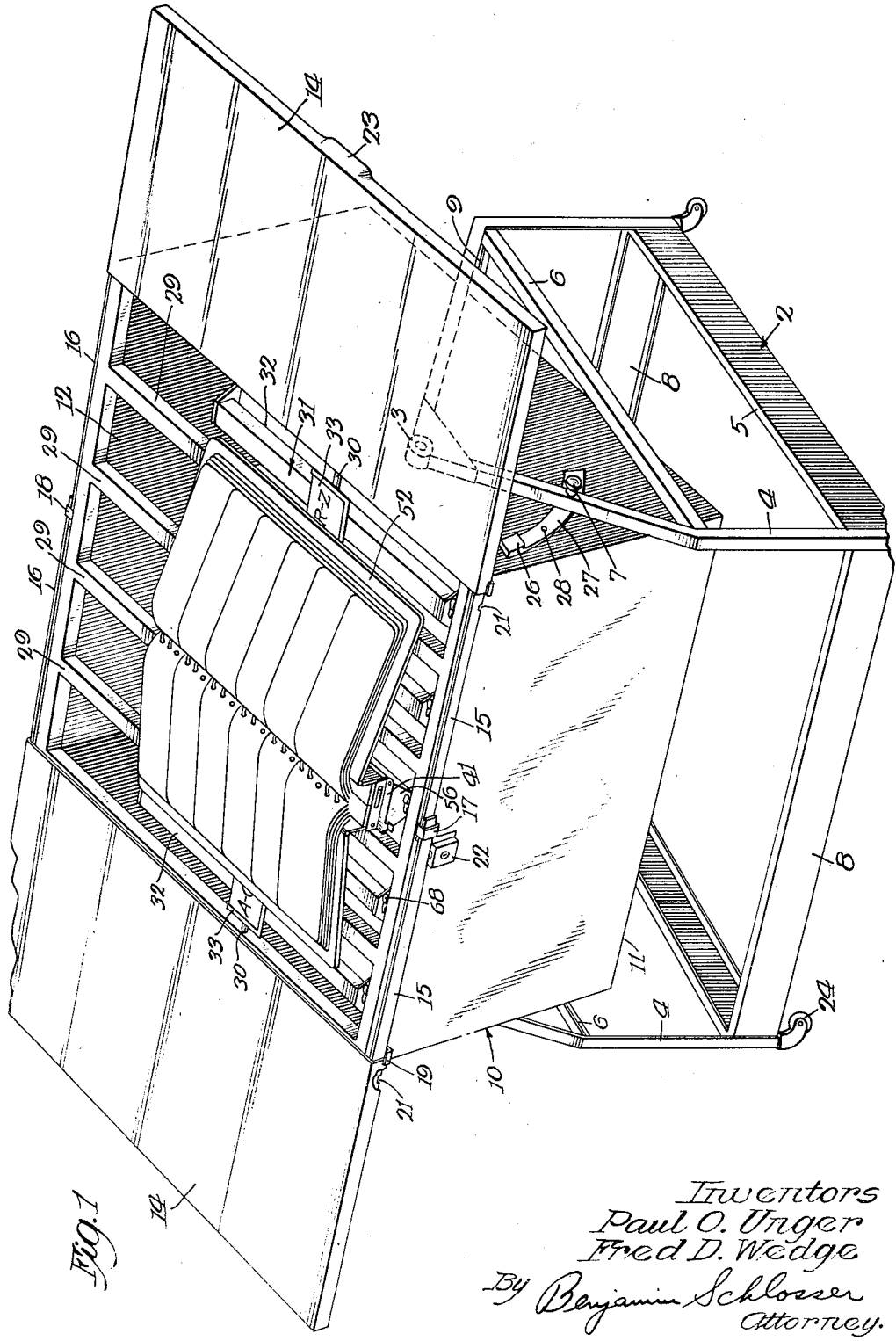
Inventors
Paul O. Unger
Fred D. Wedge
By Benjamin Schlosser
Attorney.

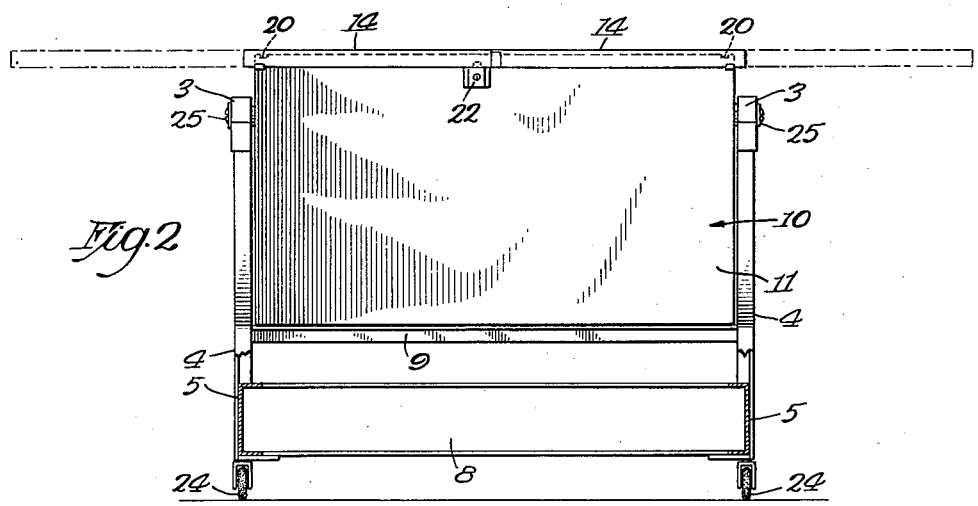
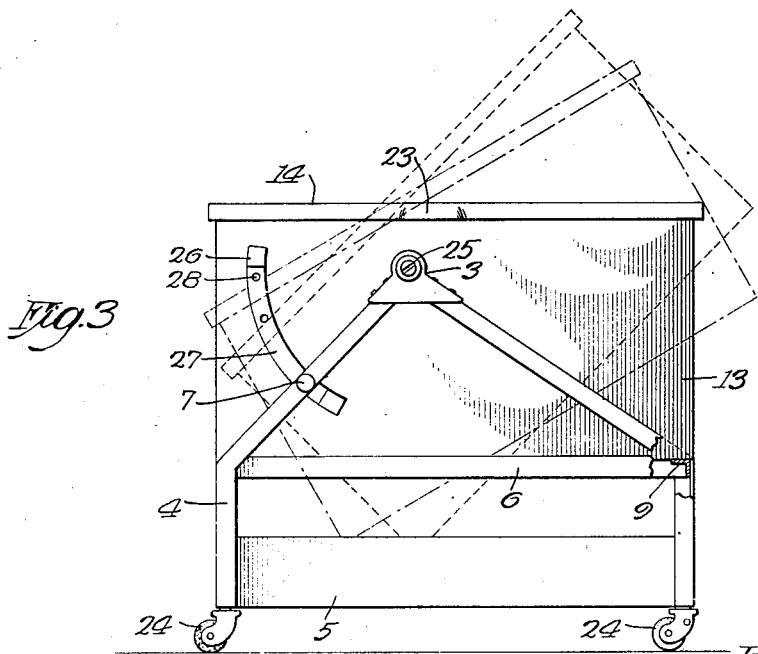

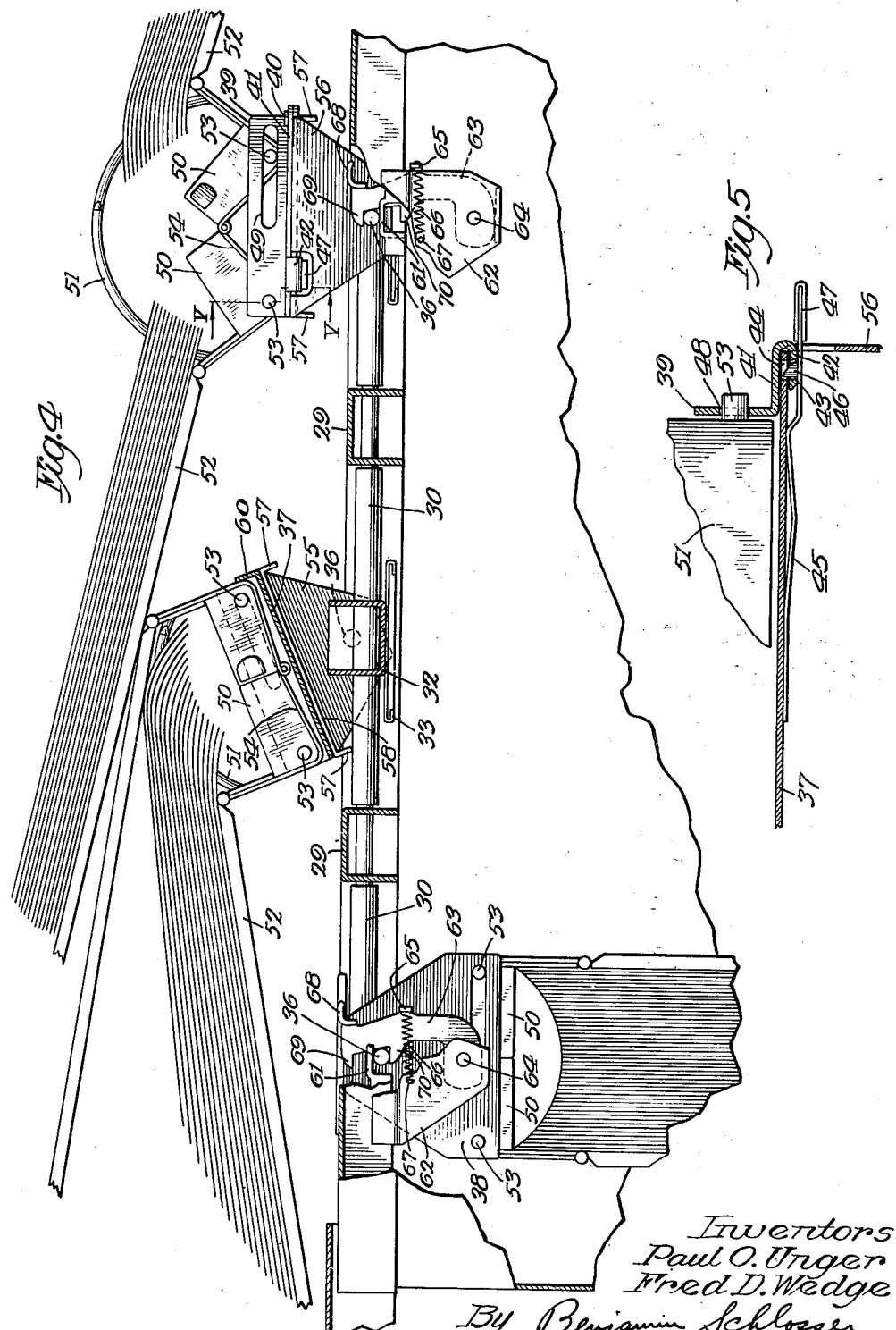

Dec. 2, 1941.  P. O. UNGER ET AL  2,264,419
CABINET
Filed Jan. 20, 1936   6 Sheets-Sheet 4

Inventors
Paul O. Unger
Fred D. Wedge
By Benjamin Schlosser
Attorney.

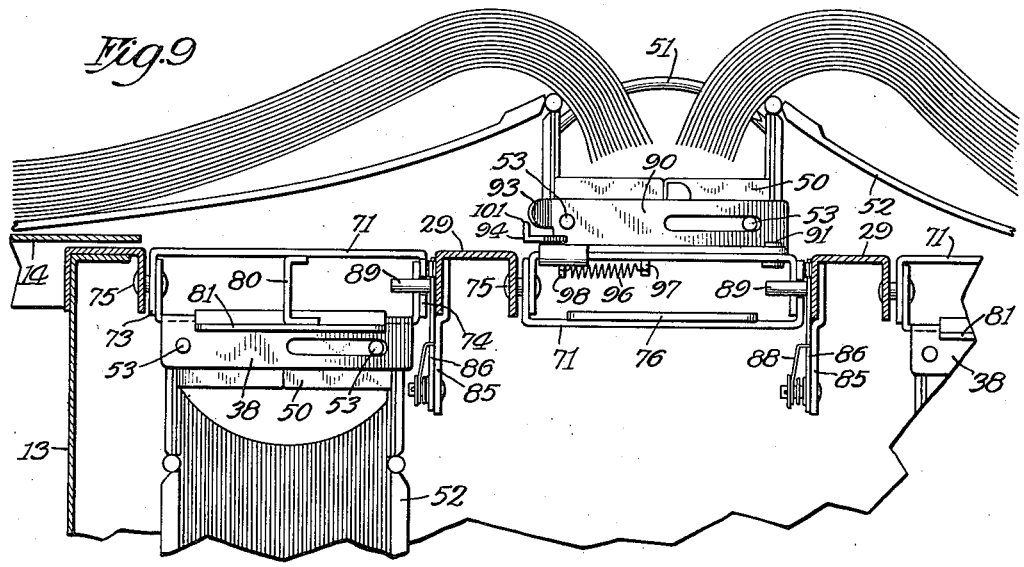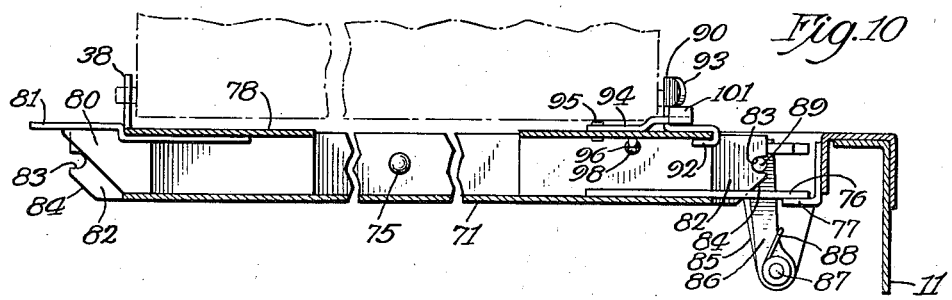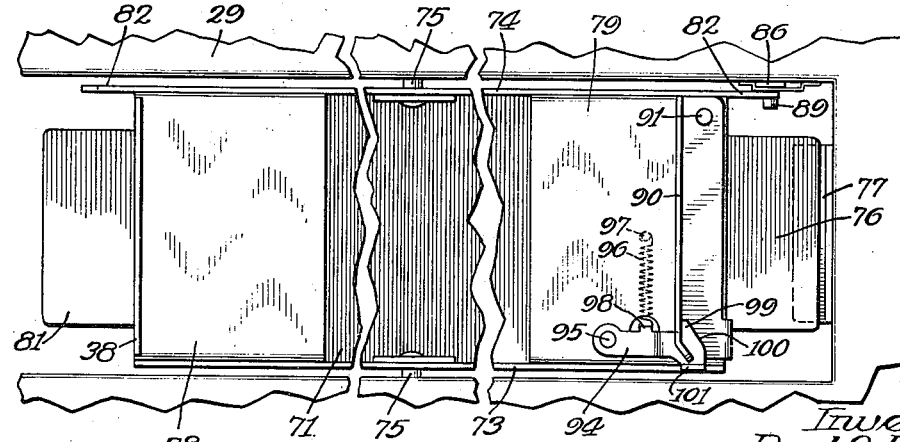

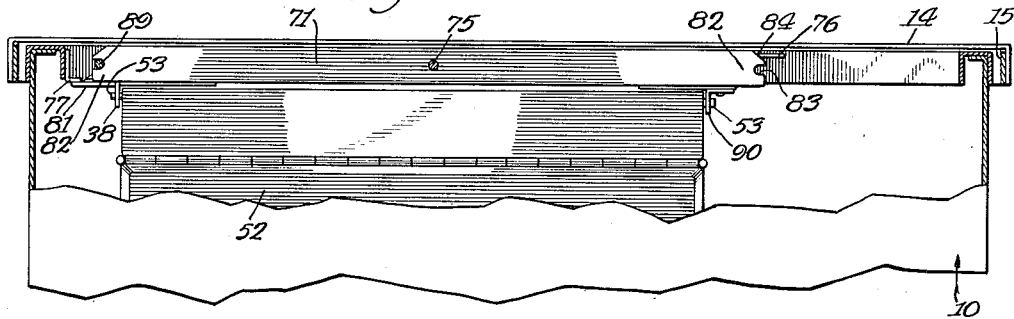
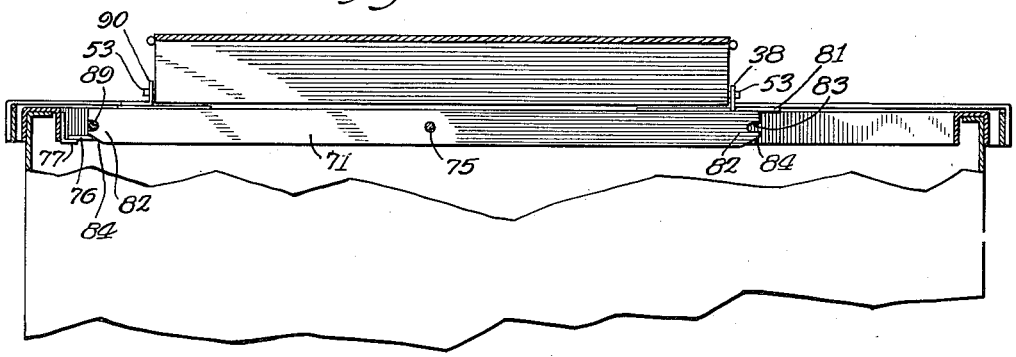
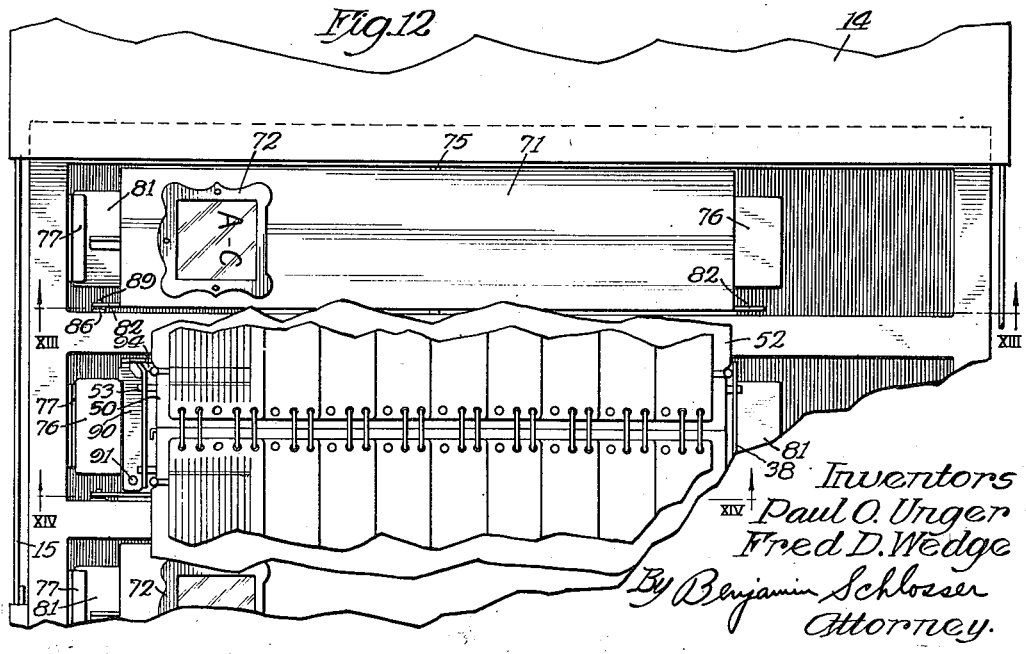

Patented Dec. 2, 1941

2,264,419

UNITED STATES PATENT OFFICE 2,264,419

CABINET

Paul O. Unger, Elmhurst, and Fred D. Wedge, Lombard, Ill., assignors to Wilson-Jones Company, Chicago, Ill., a corporation of Massachusetts Application January 20, 1936, Serial No. 59,826

25 Claims. (Cl. 312—34)

This invention relates to a cabinet adapted to house a plurality of books so as to protect them when they are not in use and to make them easily accessible for use.

It is an object of this invention to provide a cabinet with slidable covers adapted to form a completely closed case and a plurality of book supports capable of rotation through a vertical plane to conceal the books entirely within the case or to expose them on top of the case for ready reference.

It is a further object of this invention to provide a case that may be tilted to facilitate use of the books exposed thereon. It is a further object of this invention to limit the tilting movement of the case and to provide stop means to retain the case in a plurality of predetermined angular positions.

It is a further object of this invention to provide means for rocking the book supports transversely of the case to provide additional working space for the binder being used when other binders are in exposed position.

It is a further object of this invention to provide simple and efficient means for facilitating the securement of the binders to the book supports and means for retaining the book supports in either concealed or exposed position. Other objects of this invention will become apparent upon reading the following description taken in conjunction with the accompanying drawings in which Figure 1 is a perspective view of a cabinet embodying the invention;

Figure 2 is a front elevation of the cabinet in closed position;

Figure 3 is a side elevation of the cabinet;

Figure 4 is a fragmentary view, partly in elevation and partly in section, showing the book supporting mechanism;

Figure 5 is a cross sectional view taken along the line V—V of Figure 4;

Figure 9 is a fragmentary view, partly in elevation and partly in section, showing a modified form of book support;

Figure 10 is a fragmentary sectional view of the modified form of book support shown in Figure 9;

Figure 11 is a fragmentary top plan view of the modified form of book support;

Figure 12 is a fragmentary top plan view of the cabinet with a plurality of modified form of book supports;

Figure 13 is a cross sectional view taken along the line XIII—XIII of Figure 12; and Figure 14 is a cross sectional view taken along the line XIV—XIV of Figure 12.

Figure 6:
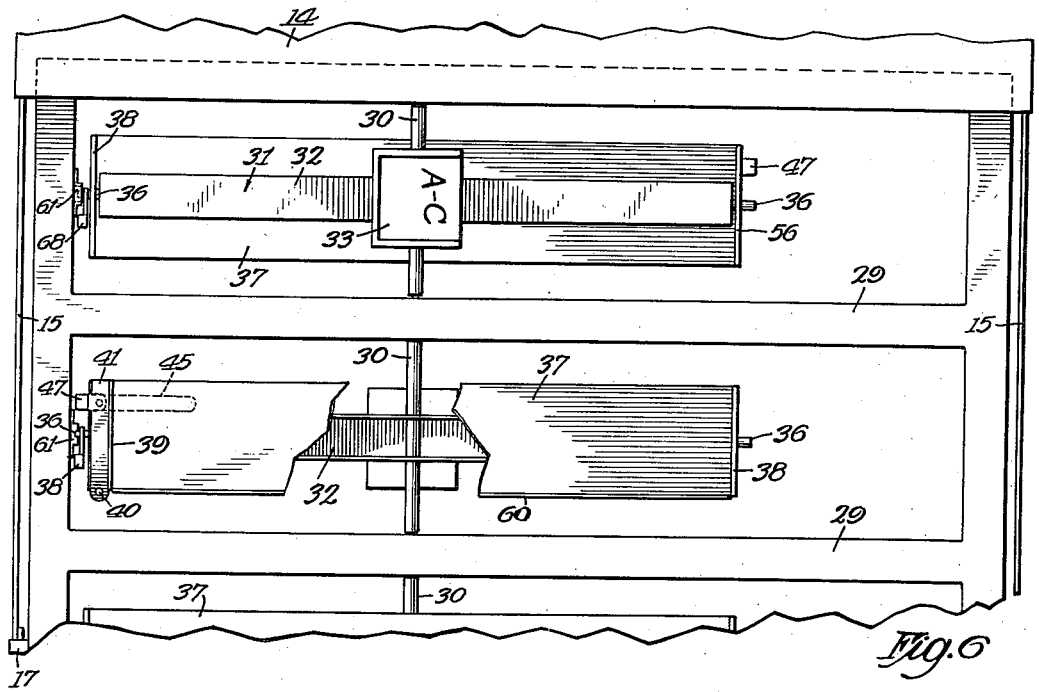
Figure 6 is a fragmentary top plan view of the cabinet showing a pair of book supports.

In the drawings, the reference numeral 2 indicates a base member provided with a journal 3 at the upper extremity of each side. Each side of the base member comprises a pair of upright members 4 tied together by horizontal cross pieces 5 and 6. The upright members 4 are bent at the height of the cross pieces 6 to meet at the journal 3. One of the members 4 has a spring impelled stop member 7 mounted on its angular portion for a purpose to be hereinafter described. the sides of the base member 2 are tied together by horizontal members 8 similar to the members 5. The back of the base member is provided with another horizontal member 9 at the same height as the members 6.

The cabinet includes a case 10 which comprises a front wall 11, a back wall 12, a pair of side walls 13, and a pair of slidable closure members 14 which cooperate to produce a completely enclosed case. Each cover member 14 is provided with a pair of strips 15 and 16 projecting toward the other cover member. A strap member 17 is provided on the front and a similar strap member 18 on the back wall of the case. The strap member 17 encircles both strips 15, and the strap member 18 encircles both strips 16. The front and rear walls of the case are each provided with a pair of supporting members 19 positioned under the strips 15 and 16 adjacent the side walls 13 to cooperate with the straps 17 and 18 to support the closure members 14 in a horizontal plane when the closure members are in their fully opened position.

Each of the strips 15 and 16 is provided near its free end with a notch 20 adapted to register with the straps 17 and 18 when the covers are fully opened. In this position the weight of the covers forces the notches 20 into engagement with the straps 17 and 18. Accordingly, when it is desired to move either cover to closed position it is necessary to lift the cover slightly to release the notches 20 from the straps 17 and 18. Accidental pressure against either cover cannot displace the cover from its fully opened position.

Each strip 15 is provided with a notch 21 in its lower edge adapted to register with a key operated lock 22 when the covers are closed. The lock may project a bolt into the notches 21 to retain the covers 14 in closed position. When the covers are locked in closed position the case is protected against tampering, fire, dust and water. If desired, the walls may be made of double thickness and insulated with asbestos to increase the fire resistance of the case. The covers 14 are each provided with a hand hold 23 to facilitate moving said covers to open position. The case is provided with a plurality of casters 24 and, if desired, the casters at the rear of the case may be tied together to hold them parallel to prevent the cabinet from being moved accidentally when the covers 14 are pulled open.

The side walls 13 of the case 10 are each provided with a trunnion 25 seating in the journals 3 to permit tilting of the case. The bottom rear edge of the case engages the horizontal member 9 when the case is in horizontal position to limit the tilting movement in one direction. One side wall 13 is provided with a projection 26 adapted to engage the angular portion of one of the upright members 4 to positively limit the tilting movement of the case to an angle of less than ninety degrees.

An arcuate shaped flat plate member 27 is secured to the wall 13 adjacent the projection 26. The plate 27 is provided with a plurality of apertures 28 adapted to cooperate with the stop pin 7 to retain the case in a plurality of predetermined angular positions. The stop pin 7 is spring pressed so that when it is pulled outwardly the case may be tilted. As soon as the pin 7 is released the spring will force it into engagement with the plate 27 so that it will automatically engage in the next aperture 28 to hold the case in the desired angular position. The journals 3 upon which the case 10 is pivoted are so positioned that the case member has a tendency to move towards horizontal position when the pin 7 is released. However, the pivot point is close to the center of gravity so that only a slight force is required to move the case to an angular position against its normal tendency to return to horizontal position.

A plurality of longitudinally extending bars 29 divides the top of the case 10 into a plurality of longitudinally extending compartments of equal area with each compartment of a size suitable to receive one book. A rod 30 extends transversely across the case 10 and passes through each bar so that the rod 30 is supported at a plurality of points. As shown in Figure 6, the rod 30 is positioned closer to the front wall 11 than to the back wall 12. A book support 31 is pivotally mounted on the rod 30 in each compartment formed by the bars 29. In view of the fact that each of the book supports and its associated structure is a duplicate of the others, only one will be described. It will be understood that the size of the cabinet may be varied to provide space for as many book supports as desired.

The book support illustrated in Figures 1, 4, 5, 6, 7 and 8 includes a channel shaped member 32 mounted on the rod 30 so as to be freely rotatable thereon. The member 32 is provided with a label holder 33 secured thereto in any desired manner. The ends of the member 32 are closed by end walls 34. A plate member 35 spaced inwardly a short distance from each wall 34 has a pin 36 secured thereto. The pin 36 passes through the wall 34 and preferably serves as a projection which extends beyond the wall 34 a distance sufficient to allow the pin to engage a stop member to be hereinafter described.

The book support includes a base member 37 which is preferably in the form of a flat plate but may consist of a pair of rods or strips of any suitable design. The main function of the base member 37 is to furnish support for a pair of transverse brackets or flanges 38, 39 secured to opposite ends of the base member. The bracket 38 is fixed, but the bracket 39 is preferably pivoted to the base member 37 by means of a stud 40. The bracket 39 is provided with a horizontal portion 41 (Figure 5) and a lip 42 bent under the portion 41 and spaced therefrom to embrace the end of the flat plate member 37. The lip 42 and the plate 37 are provided with registering apertures 43 and 44, respectively. A flat spring member 45 is secured to the underside of the base member 37 and is provided with a projecting member 46 adapted to engage both apertures 43 and 44 when the bracket 39 is swung to book supporting position. The spring member 45 is provided with a finger piece 47 which is depressed to disengage the projection 46 from the apertures 43 and 44 to permit the bracket 39 to be swung outwardly to permit removal of the book. Each bracket 38 and 39 is provided with a round aperture 48 and an elongated aperture 49.

The support is particularly adapted to be used with books comprising a pair of hinged back sections 50 to which sheet retaining prongs 51 and covers 52 are secured. As shown in Figure 4, the book is provided with stiff covers, but it will be understood that flexible covers may be used if desired. Each end of each back section 50 is provided with a stud 53 projecting therefrom a short distance above the bottom 54 of the book.

The apertures 48 and 49 are adapted to receive the studs 53. The apertures 48 and 49 are spaced from the base member 37 a distance greater than the distance between the studs 53 and the bottom 54 of the book so that the book is suspended out of contact with the base member 37 when the studs are in the apertures. This arrangement facilitates opening of the book while in the support because the friction incidental to moving the back sections of the book is substantially reduced by the suspension of the book. The elongated apertures 49 permit transverse movement of one stud 53 and back section 50 relative to the other stud and back section.

The ends of the base member are provided with a pair of angular members 55, 56 which may be bent from the plate 37 or may be secured thereto in any suitable manner. The members 55 and 56 are pivotally mounted on the pins 36 so that the book support can be rocked transversely of the case. The base member 37 has a pair of downwardly projecting stop members 57 secured to the underside of the base member in any desired manner. The stop members 57 may be formed by bending the ends of an integral strip 58, or may comprise two separate members. The stop members 57 are adapted to engage the rod 30 when the book support is rocked in either direction and limit the rocking movement so that it is impossible for an operator to get his or her fingers caught between the edge of the book support and the bar 29. Since each book support is alike, each support may be rocked transversely of the case independently of any other support. Accordingly, if all the books are in exposed position and it is desired to open one book, the book supports, and the books secured thereto, on one side of the book to be used are rocked in one direction, and those on the opposite side are rocked in the opposite direction to allow a maximum space for the use of the desired binder. The member 56 is apertured, as indicated at 59, to allow the lip 42 and the finger piece 47 to pass therethrough. The base member 37 is provided with a flange 60 projecting from the longitudinal edge nearest the apertures 49. The flange 60 serves as a support to position the book with the studs 53 aligned with the apertures 48, and thereby facilitates securement of the book to the book support 32.

Figure 7:
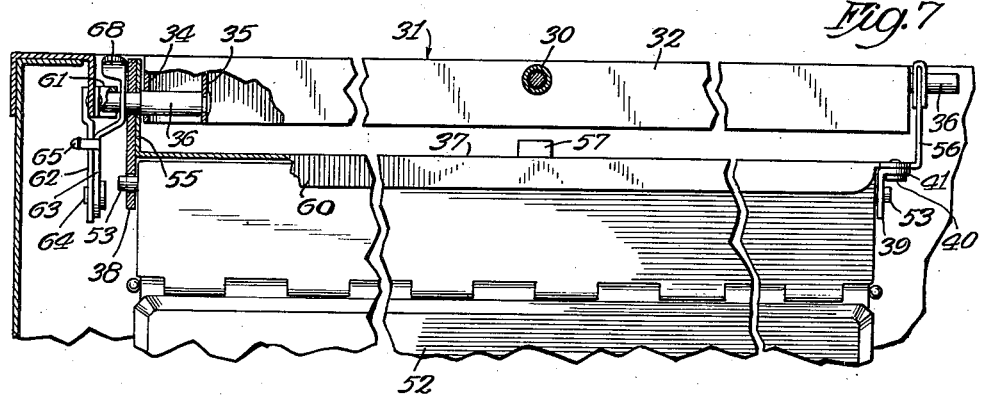
Figure 7 is a fragmentary sectional view showing a book support with the book in concealed position.
Figure 8:
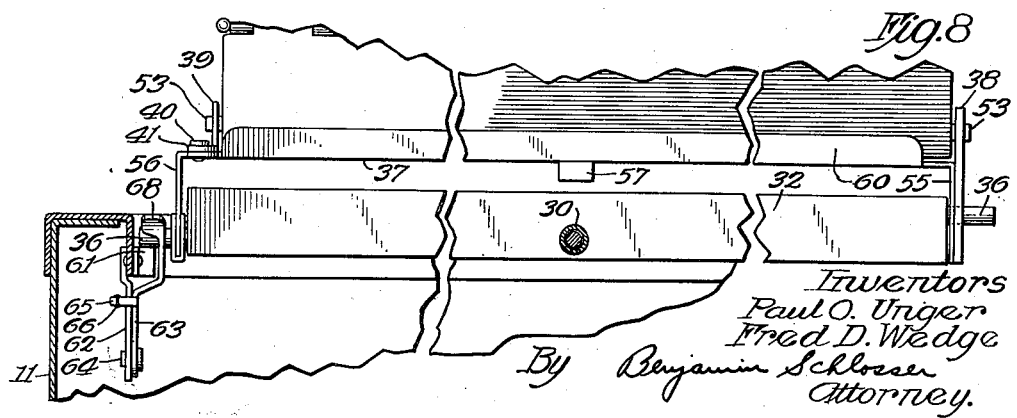
Figure 8 is a view similar to Figure 7 with the book in exposed position.

The inner surface of the front wall 11 of the case is provided with an inwardly projecting stop member 61 secured thereto in any suitable manner. When the book support is in position to conceal the book in the case one pin 36 engages the underside of the stop member, and when the book support is rotated through 180 degrees the other pin 36 engages the upper surface of the stop member. As shown in Figures 7 and 8, the pins 36 at opposite ends of the book support are spaced at different elevations so that the book support is in a plane parallel to the top of the case regardless of which pin 36 is in engagement with the stop member. If desired, the pins 36 might be made short so as to serve only as pivots for the rocking movement of the book support, and a projection might be formed from or secured to each member 55, 56, in any suitable manner to replace the projecting portion of the pin 36. It is essential only that some projection be provided on each end of the book support.

The front wall of the case 10 is provided on its inner surface with a depending plate 62 to which a latch member 63 is pivoted, as indicated at 64. The latch member 63 is provided with a projection 65 to which one end of a coiled spring 66 is secured. The opposite end of the spring 66 is secured to the plate 62, as indicated at 67. The spring 66 exerts a constant force urging the latch member towards the plate member 62. The projection 65 engages the edge of the plate 62 to limit the movement of the latch member 63 in that direction. The latch member is provided with a finger piece 68 to facilitate manual movement of the latch member against the action of the spring 66.

The latch member 63 is provided with a pair of teeth 69 and 70. The upper tooth 69 has its upper edge rounded or beveled, and its lower edge sharp. The lower tooth 70 has its upper edge sharp and its lower edge rounded or beveled. The space between the sharp edges of the teeth 69 and 70 is approximately equal to the combined thickness of the stop member 61 and both projections 36 and is divided by the stop member 61 so that the space between the stop member and the sharp edge of each tooth is sufficient to receive one of the projections 36.

Accordingly, if the book support is to be moved from one position to the other, the latch is pressed outwardly to disengage the tooth 69 or 70 from its latching position and the book support is rotated through an angle of 180 degrees. The projection 36 will engage the rounded edge of the tooth 69 or 70 and will force the latch member 63 outwardly until the projection passes the tooth. When the projection engages the stop member 61 the spring forces the member 63 back to latching position and the book support is securely retained in the desired position.

In the embodiment of the invention illustrated in Figures 9 to 14, inclusive, it is to be understood that the cabinet structure is the same as previously described and the only differences are in the structure of the book supports and the means for latching the book supports in position to expose or to conceal the books secured thereto. All of the book supports and associated mechanism in this embodiment are duplicates of each other so only one will be described.

The book support comprises a flat plate or base member 71 which may be provided with a label holder 72 on its back side. The longitudinal edges of the base member are bent downwardly to form a pair of flanges 73 and 74 which furnish bearings for a pair of studs 75 by means of which the book support is pivoted to rotate in a vertical plane. If desired, a single rod such as the rod 30 in the previously described embodiment might be used instead of the plurality of short rods 75. The plate member 71 is provided with an extension 76 projecting from one end and adapted to engage a stop member 77 projecting inwardly from the front wall 11 of the case to limit the rotation of the book support in one direction.

A pair of short plate members 78 and 79 are secured to the base member 71. A bracing member 80 may be positioned between the plates 71 and 78 to provide reinforcement if desired. The plate 78 is provided with an extension 81 similar to the extension 76 adapted to engage the lower surface of the stop member 77 when the book support is rotated through 180 degrees.

The flange 74 is preferably extended beyond the ends of the base member 71, as indicated at 82. The projections 82 are each provided with a recess or notch 83 in the end thereof. The edge of the projection 82 between the recess 83 and the plate 71 is beveled, as indicated at 84. A depending flat plate member 85 is secured to one wall of the bar 29 near the front of the cabinet. An arm 86 is pivotally secured to the plate 85 by means of a pivot pin 87. A spring 88 is secured to the pin 87 and has one end urging the arm 86 rearwardly. The arm 86 is provided with a projection 89 adapted to engage with either recess 83 to latch the book support in either book exposing or concealing position. When the book is to be moved from one position to the other, the projection 89 is manually moved forwardly against the action of the spring 88 to disengage the projection from the recess 83 and the book support is rotated through 180 degrees. The beveled surface 84 engages the projection 89 and forces it forward against the action of the spring 88 until the other recess is aligned with the projection 89. As soon as the recess 83 is in alignment with the projection 89 the spring 88 forces the projection into the recess to latch the book support in the desired position.

The book support is provided with a fixed bracket 38 at one end and a pivoted bracket 90 at the other end similar to the brackets 38 and 39 described in connection with the previously described embodiment. The only difference between the two embodiments of the invention in this respect relates to the method of latching the pivoted bracket 90 in book supporting position.

The bracket 90 swings about a pivot pin 91 and is provided with a lip 92 adapted to embrace the end of the plate 79. The free end of the bracket is provided with a finger piece 93 to facilitate pivotal movement of the bracket. A latch member 94 is pivoted to the plate 79, as indicated at 95. A coiled spring 96, having one end secured to a projection 97 depending from the plate 79 and its other end secured to a projection 98 depending from the latch 94, urges the latch towards the edge of the bracket 90. The latch is provided with a tooth 99 adapted to engage the bracket 90 to hold it in book supporting position. The outer edge of the tooth is beveled, as indicated at 100, to enable the bracket to push it out of the way momentarily when the bracket is being moved to book supporting position. The latch 94 is provided with a finger piece 101 to facilitate release movement of the latch when it is desired to swing the bracket 90 out of book supporting position.

From the foregoing it will be seen that we have designed a simple and efficient means for protecting a plurality of books when they are not in use and for quickly and easily moving them to positions in which they can be used with facility. Each book support is adapted to be turned in a vertical plane independently of the other book supports so that only the desired books are exposed on the top of the case. The case may be tilted to predetermined positions to increase the convenience of using the books. Although we have described the invention with particular reference to books of the loose leaf type having hinged back sections, it is obvious that many of the advantages of the structure may be retained with the cabinet designed for loose leaf books of other kinds and even with bound books.

Although we have described two embodiments of our invention in detail, it will be understood that the description thereof is illustrative, rather than restrictive, as many details may be modified or changed without departing from the spirit or scope of our invention. Accordingly, we do not desire to be restricted to the exact construction described, except as limited by the appended claims.

We claim:

1. A cabinet comprising a base member, a pair of spaced journals on opposite sides of said base member, a case provided with a plurality of individual book supports, said case having a pair of trunnions supported in said journals to permit tilting of said case, and means to stop the tilting movement of said case automatically at a plurality of predetermined points.

2. In a cabinet, a case, a book support secured in said case, means for turning said support in a vertical plane through an angle of 180 degrees, means for tilting said case, and means for positively limiting said tilting movement to an angle of less than 90 degrees.

3. In a cabinet, a case, a plurality of book supports mounted in said case, means for tilting said case with said book supports, and means for turning said book supports in a vertical plane independently of each other and of said case.

4. In a cabinet, a case, means within said case for supporting a book, means for tilting said case with said supporting means, and means for turning said supporting means in a vertical plane independently of said case.

5. In a cabinet, a case, and a plurality of book supports pivoted in said case to turn through an angle of 180 degrees to conceal or to expose a plurality of books mounted in said supports, said book supports being provided with means whereby they may be rocked transversely of said case independently of each other.

6. In a cabinet, a base member, a case pivotally mounted on said base member to tilt through an angle of less than 90 degrees, and a plurality of book supports secured in said case, each of said book supports being pivoted to rock transversely of said case.

7. In a cabinet, a case, a plurality of book supports within said case, means for tilting said case with said book supports, means pivoting each of said book supports to turn in a vertical plane independently of said tilting means, and means pivoting each of said book supports to rock transversely of said case.

8. A cabinet comprising a base member, a pair of spaced journals on opposite sides of said base member, a case provided with trunnions supported in said journals to permit tilting of said case, a plurality of book supports mounted in said case, each of said book supports being adapted to support a book exposed on said case or concealed within said case, and pivot means on each of said book supports adapted to permit rocking of said book supports transversely of said case.

9. In a cabinet, a case member, a rod extending transversely of said case member, and a plurality of book supports mounted on said rod, said book supports being individually rotatable on said rod and being provided with means whereby they may be individually rocked transversely of said rod.

10. In a cabinet, a case, means for supporting a book with the contents of the book concealed entirely within said case, means pivoting said supporting means to move through an angle of 180 degrees to expose the contents of said book, means for holding said supporting means in either of said two positions, and means pivoting said supporting means to rock transversely of said case when said book is in exposed position.

11. In a cabinet, a case, a rod extending transversely of said case, a book support mounted on said rod, said book support being so constructed and arranged as to rock transversely of said case, and stop means on said book support adapted to engage said rod to limit said rocking movement.

12. In a cabinet, a case, a book support mounted in said case and rockable transversely thereof, and means to limit said rocking movement to prevent said book support from striking the wall of said case.

13. In a cabinet, a book support, a projection adjacent the front end of said cabinet adapted to cooperate with either end of said support to retain said support in position to expose or to conceal a book mounted on said support.

14. In a cabinet, a book support pivotally mounted in said cabinet, a stop member projecting inwardly from one wall of said cabinet, a projection on each end of said support, one of said projections being adapted to engage one surface of said stop member when said book support is in position to expose a book mounted thereon, the other of said projections being adapted to engage the opposite surface of said stop member when said book support is in position to conceal a book mounted thereon, and latching means adapted to hold either of said projections in engagement with said stop member.

15. In a cabinet, a book support pivoted to rock transversely of said cabinet, and a flange projecting from one longitudinal edge of said support to facilitate the proper positioning of a book on said support.

16. A book support including a transverse bracket fixed at one end of said support, another transverse bracket pivotally secured to the opposite end of said support, said pivoted bracket swinging in a plane parallel to the plane of said support, and a latch adapted to retain said pivoted bracket in position parallel to said fixed bracket.

17. In a book support, a pair of transverse brackets at opposite ends of said support, each of said brackets having a pair of apertures adapted to receive projections extending from the ends of a book, one of said brackets being pivoted at one end to said support to permit the removal or insertion of a book.

18. In a book support, a transverse bracket rigidly secured to one end of said support, a transverse bracket pivotally secured at the opposite end of said support, each of said brackets having a pair of apertures adapted to receive projections on a hinged back book, one aperture of each of said pair of apertures being elongated to permit relative movement of the back sections of a book mounted on said support, and a flange projecting from the longitudinal edge of said support closest to said elongated apertures to facilitate positioning of a book on said support.

19. In a book support, a transverse bracket rigidly secured to one end of said support, another transverse bracket pivotally secured to the opposite end of said support, said brackets having apertures adapted to receive pins projecting from opposite ends of a book to be supported, and a latch secured adjacent said opposite end of said support to retain said pivoted bracket in book supporting position.

20. In a book support, a transverse bracket rigidly secured to one end of said support, a transverse bracket pivotally secured at the opposite end of said support, a lip projecting from said second mentioned bracket, and a spring pressed member secured to said support, said spring pressed member being adapted to cooperate with said lip to hold said second mentioned bracket in book supporting position.

21. In a cabinet, a book support mounted to be rotatable through a vertical plane to expose or to conceal a book supported thereon, and a stop member positioned adjacent the front edge of the cabinet, said stop member being adapted to engage either of a pair of projections extending from said book support to prevent rotation of said book support beyond 180 degrees from either book exposing or book concealing position.

22. In a cabinet, a case, a plurality of book supports pivoted in said case to turn through an angle of 180 degrees to conceal a plurality of books mounted in said supports in said case or to expose said books upon the top of said case, means whereby each of said book supports may be moved when exposed upon the top of said case so as to increase the space between any two adjacent book supports to facilitate reference to any book mounted in said supports when more than one book is in exposed position.

23. In a cabinet, a case, a plurality of book supports mounted within said case, means for turning said book supports in a vertical plane to expose books mounted in said book supports upon the top surface of said case, latching means for positively holding said book supports within said case or exposed upon said case, and means for increasing the space between any two exposed adjacent book supports to facilitate reference to any book mounted in said supports when more than one book is in exposed position.

24. In a book support, a transverse bracket secured to one end of said support, said bracket having a pair of apertures adapted to receive projections on a book to be supported, and a flange projecting from one longitudinal edge of said support, said flange being adapted to guide a book to position the projections in said apertures.

25. A support for a sheet retaining unit comprising a pair of back sections hinged together, each of said sections including a pair of oppositely disposed end walls, a projection extending from each end wall of each back section, said support having a pair of end walls movable relative to each other and each provided with a pair of apertures, said projections engaging said apertures when said sheet retaining unit is mounted in said support, said apertures being shaped to permit pivotal movement of said back sections about their hinge.

PAUL O. UNGER.
FRED D. WEDGE.